March 14, 1967 R. BOISSONNAS ETAL 3,309,353
L-PYROGLUTAMYL-L-PROLYL-L-SERYL-L-LYSYL-L-ASPARTYL-L-ALANYL-L-
PHENYLALANYL-L-ISOLEUCYL-GLYCYL-L-LEUCYL-L-METHIONINAMIDE
AND ITS ACID ADDITION SALTS WITH PROTECTIVE
GROUPS ON THE ε-AMINO RADICAL OF LYSINE
Filed July 11, 1962 2 Sheets-Sheet 1

*FIG. 1*

*FIG. 2*

INVENTORS
ROGER BOISSONNAS
EDMOND SANDRIN
BY Jacobs & Jacobs
ATTORNEYS

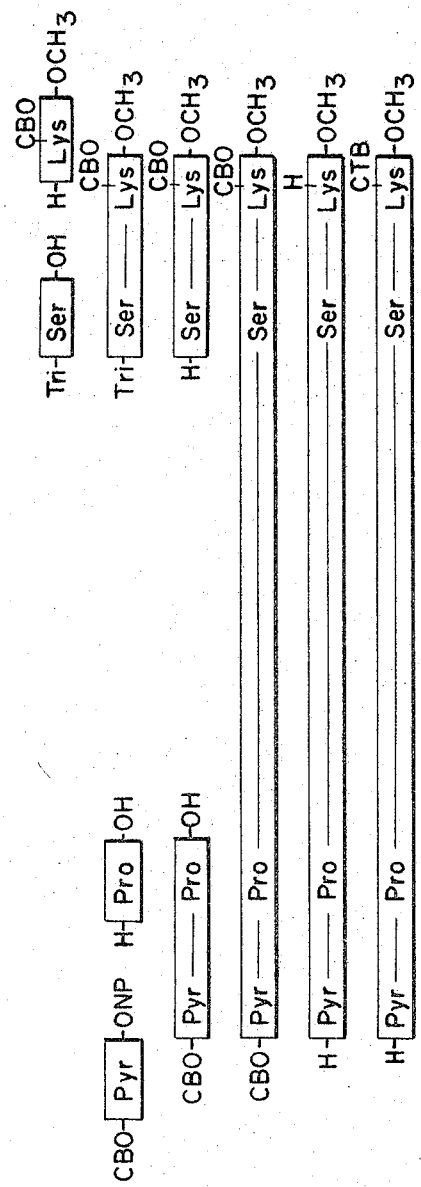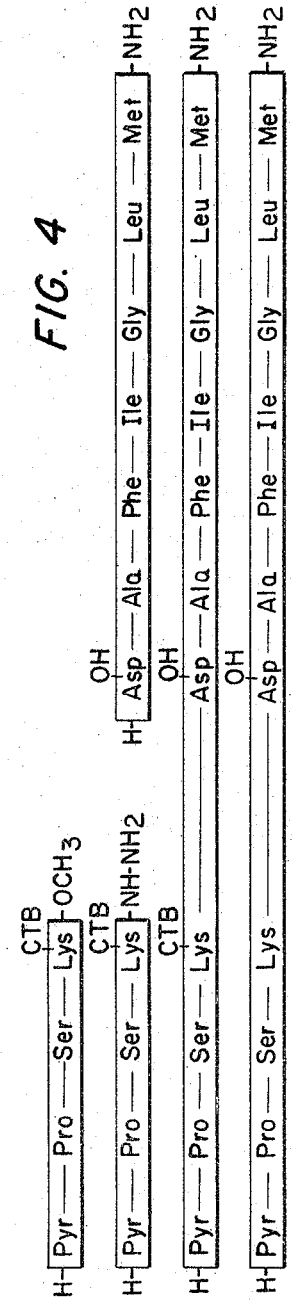

United States Patent Office 3,309,353
Patented Mar. 14, 1967

3,309,353
L - PYROGLUTAMYL - L - PROLYL - L - SERYL - L-
LYSYL - L - ASPARTYL - L - ALANYL - L - PHEN-
YLALANYL - L - ISOLEUCYL - GLYCYL - L - LEU-
CYL-L-METHIONINAMIDE AND ITS ACID ADDI-
TION SALTS WITH PROTECTIVE GROUPS ON
THE ε-AMINO RADICAL OF LYSINE
Roger Boissonnas, Bottmingen, Basel-Land, and Edmond
Sandrin, Basel, Switzerland, assignors to Sandoz Ltd.,
Basel, Switzerland, a Swiss firm
Filed July 11, 1962, Ser. No. 209,811
Claims priority, application Switzerland, July 14, 1961,
8,264/61
8 Claims. (Cl. 260—112.5)

The present invention relates to a new hendecapeptide and to a process for its production.

The present invention comprises the hendecapeptide L-pyroglutamyl - L - prolyl - L - seryl - L - lysyl - L - aspartyl-L - alanyl - L - phenylalanyl - L - isoleucyl - glycyl - L-leucyl-L-methionine amide, its acid addition salts and pharmaceutical compositions containing, in addition to an inert carrier, a therapeutically effective amount of the above mentioned hendecapeptide and/or an acid addition salt thereof.

The present invention further resides in procedure for the production of the said hendecapeptide, characterized in that L-pyroglutamyl-L-prolyl-L-seryl-L-lysine, having a protective group on the ε-amino radical of the lysine radical and having, optionally, a protective group on the end amido radical of the L-pyroglutamine radical and having, optionally, the carboxyl radical of the lysine radical substituted with a radical reactive with amino radicals, is condensed with L - aspartyl - L - alanyl-L-phenylalanyl-L-isoleucyl-glycyl-L-leucyl-L-methionine amide having, optionally, a protective group on the β-carboxyl radical of the aspartic acid radical, the protective group or groups is or are split off in one or more stages from the resulting protective group-containing hendecapeptide to give the required hendecapeptide free of protective groups and, when an acid addition salt is required, salification is effected with a suitable organic or inorganic acid.

Various inorganic and organic acids suitable for effecting salification of the hendecapeptide of the invention include hydrochloric, hydrobromic, sulphuric, citric, oxalic, tartaric, succinic, maleic, malic, acetic, benzoic, hexahydrobenzoic, methanesulphonic, fumaric, gallic and hydriodic acids.

The following are examples of protective groups for the end positioned amido radical of the L-pyroglutamine radical: carbobenzoxy, toluenesulphonyl, carbo - tert.-butoxy and p-nitro-carbobenzoxy radicals. Carbobenzoxy, toluenesulphonyl, carbo-tert.-butoxy, phthalyl, formyl, trifluoroacetyl and p-nitro-carbobenzoxy radicals are, e.g., suitable for the protection of the ε-amino radical of the lysine radical. Radicals suitable for the protection of the β-carboxyl radical of the aspartic acid radical are, for example, benzyl, p-nitrobenzyl, methyl, ethyl, tert.-butyl and amido radicals. Examples of groups in the tetrapeptide, which groups are reactive with the amino radical in the end position of the heptapeptide, are azide and p-nitrophenyl ester radicals. An asymmetric anhydride of the tetrapeptide or the reaction product of the tetrapeptide with dicyclohexyl-carbodiimide is likewise reactive with said amino radical and hence suitable for use in the process of the invention.

The hendecapeptide of the invention has a strong blood pressure lowering effect and is thus useful as a hypotensive agent. Because of its action on the vascular system the hendecapeptide of the invention has the properties of a vasodilator useful for combating circulatory disorders, e.g., spasm, angina pectoris and infarcts, to eliminate vascular spasm and to improve blood circulation in the cerebral vessels. Furthermore, the hendecapeptide of the invention has properties useful for promoting passage of medicaments from the bloodstream into the tissues.

The new hendecapeptide can be synthesized in a variety of ways as illustrated in the accompanying diagrammatic drawings wherein certain abbreviations are used the meanings of which are set forth below.

In one such synthesis, N-carbobenzoxy-L-phenylalanine p-nitro-phenylester is condensed with L-isoleucine-methylester, the carbobenzoxy radical split off and the formed dipeptide ester condensed with N-carbobenzoxy-L-alanine. The resulting tripeptide ester is condensed with N-carbobenzoxy-L-aspartic acid β-benzyl ester after splitting off the carbobenzoxy radical. After splitting off the carbobenzoxy and the benzyl radicals, the resulting free tetrapeptide ester is reacted with tert.-butyl-p-nitrophenyl-carbonate. The resulting N-carbo-tert.-butoxy-L-aspartyl-L-alanyl-L-phenylalanyl-L-isoleucine methylester is converted to the corresponding azide via the corresponding hydrazide (see FIG. I). This is then condensed with glycyl-L-leucyl-L-methionine amide obtained by condensation of N-trityl-glycyl-L-leucine with L-methionine amide and splitting off the trityl radical. The resulting heptapeptide amide is converted to L-aspartyl-L-alanyl-L-phenylalanyl-L-isoleucyl-glycyl-L-leucyl-L-methionine amide by treating with trifluoroacetic acid (see FIG. II).

N-carbobenzoxy-L-pyroglutamyl-p-nitrophenyl ester is condensed with L-proline and the resulting dipeptide condensed with L-seryl-ε-N-carbobenzoxy-L-lysine methyl ester obtained by condensation of N-trityl-L-serine with ε-N-carbobenzoxy-L-lysine methyl ester and splitting off the trityl radical. After splitting off the carbobenzoxy radicals by catalytic hydrogenation, the resulting free tetrapeptide ester is reacted with tert.-butyl-p-nitrophenyl-carbonate, the resulting L-pyroglutamyl-L-prolyl-L-seryl-ε-N-carbo-tert.-butoxy-L-lysine methyl-ester (see FIG. III) is converted to the corresponding azide via the corresponding hydrazide, the azide being condensed with the above described heptapeptide. Treatment of the protected hendecapeptide with trifluoroacetic acid yields the biologically active hendecapeptide (see FIG. IV) and, when desired, salification may be effected in manner known per se. The term "known" with a suitable acid as used herein indicates a method in actual use or described in the literature on the subject.

It is also within the scope of the present invention to produce the above hendecapeptide by removing in one or more steps the protective group or groups in the above protective group-containing hendecapeptide, i.e. the condensation product of said tetrapeptide with said heptapeptide. The protective group or groups is or are removed in manner known per se.

The above protective group-containing hendecapeptide also forms part of the present invention and is useful as an intermediate for the preparation of the hendecapeptide free from protective groups.

The present invention also includes pharmaceutical compositions containing, in addition to an inert carrier, the hendecapeptide of the invention and/or an acid addition salt thereof in a therapeutically effective amount.

The following abbreviations are used in the specification and drawings:

H—Pyr—OH=L-pyroglutamine
H—Pro—OH=L-proline
H—Ser—OH=L-serine
H—Lys—OH=L-lysine
H—Asp(OH)—OH=L-aspartic acid
H—Ala—OH=L-alanine
H—Phe—OH=L-phenylalanine
H—Ile—OH=L-Isoleucine
H—Gly—OH=Glycine
H—Leu—OH=L-leucine
H—Met—NH$_2$=L-methionine amide
CBO=Carbobenzoxy
CTB=Carbo-tert.-butoxy
Tri=Trityl
ONP=p-Nitro-phenyloxy
OMe=Methoxy
OBz=Benzyloxy In the following non-limitative example all temperatures are given in degrees centigrade. Procedure 1 illustrates the production of N-carbobenzoxy-L-alanyl-L-phenylalanyl-L-isoleucine-methylester (see FIG. I), procedure 2 the production of N-carbo-tert.-butoxy-L-aspartyl-L-alanyl-L-phenylalanyl-L-isoleucine hydrazide (see FIG. I), procedure 3 the production of L-aspartyl-L-alanyl-L-phenylalanyl-L-isoleucyl-glycyl-L - leucyl - L - methionine amide (see FIG. II), procedure 4 the production of L-pyroglutamyl-L-prolyl-L-seryl-ε-N-carbo-tert. - butoxy-L-lysine methylester (see FIG. III), and procedure 5 the production of L-pyroglutamyl-L-prolyl-L-seryl-L-lysyl-L-aspartyl-L-alanyl-L-phenylalanyl - L - isoleucyl-glycyl-L-leucyl-L-methionine amide (see FIG. IV).

EXAMPLE

*Procedure 1: (see FIG. I) CBO-Ala-Phe-Ile-OCH$_3$*

168 g. of CBO-Phe-ONP and 58 g. of H-Ile-OCH$_3$ are dissolved in 1000 cc. of chloroform, the mixture is left to stand overnight at 20°, washed with water, dilute hydrochloric acid and aqueous sodium bicarbonate, dried over sodium sulphate, evaporated in a vacuum and ethyl ether added to the residue. 130 g. of CBO-Phe-Ile-OCH$_3$ (melting point 106°), crystallize and this is dissolved in 1100 cc. of a 3.5 N solution of hydrogen bromide in glacial acetic acid. After 1 hour at 20° the mixture is evaporated in a vacuum, ethyl ether added, the crystalline product dissolved in 600 cc. of chloroform and 48 cc. of triethylamine, 72 g. of dicyclohexyl-carbodiimide and 68 g. of CBO-Ala-OH are added. The mixture is left to stand overnight at 0°, filtered, the solution washed with water, dilute hydrochloric acid and aqueous sodium bicarbonate, the mixture dried over sodium sulphate, evaporated in a vacuum and ethyl ether added to the residue. 132 g. of CBO-Ala-Phe-Ile-OCH$_3$ (melting point 152°; $[\alpha]_D^{20}=-20°$ in 95% acetic acid) crystallize.

*Procedure 2: (see FIG. I) CTB-Asp (OH)-Ala-Phe-Ile-NH-NH$_2$*

132 g. of CBO-Ala-Phe-Ile-OCH$_3$ are dissolved in 1500 cc. of a 3.5 N solution of hydrogen bromide in glacial acetic acid, the mixture left to stand at 20° for 1 hour, evaporated in a vacuum, ethyl ether added, the crystallized compound dissolved in 1200 cc. of chloroform, 95 g. of CBO-Asp (OB)-OH, 37 cc. of triethylamine and 60 g. of dicyclohexyl-carbodiimide added. The mixture is left to stand overnight at 0°, filtered, the solution washed with water, dilute hydrochloric acid and aqueous sodium bicarbonate, the mixture is dried over sodium sulphate, evaporated in a vacuum and ethyl ether added to the residue. 140 g. of tetrapeptide (melting point 135°, decomposition; $[\alpha]_D^{21}=-24°$ in 95% acetic acid) crystallize, this is dissolved in 1600 cc. of 90% methanol and hydrogenated at 20° and normal pressure in the presence of a palladium catalyst so as to split off the carbobenzoxy and the benzyl radicals. The mixture is filtered, evaporated in a vacuum, dissolved in 1200 cc. of dimethyl formamide and 28 cc. of triethylamine and 200 g. of tert.-butyl-p-nitro-phenyl-carbonate are added. The mixture is evaporated in a vacuum after standing for 40 hours at 20°, dissolved in ethyl acetate, washed with dilute acetic acid, dried over sodium sulphate, evaporated in a vacuum and ethyl ether added. 93 g. of CTB-Asp (OH)-Ala-Phe-Ile-OCH$_3$ (melting point 120°, decomposition; $[\alpha]_D^{21}=-55°$ in methanol) crystallize and a solution of 250 g. of hydrazine hydrate in 1000 cc. of methanol is added hereto. After 4 days at 20° the mixture is evaporated in a vacuum, the residue dissolved in 300 cc. of water, brought to a pH value of 4.5 with 4 N hydrochloric acid, cooled to 0° and filtered. 73 g. of CTB-Asp (OH)-Ala-Phe-Ile-NH-NH$_2$ (melting point 220°, decomposition), result, $[\alpha]_D^{21}=-62°$ in methanol.

*Procedure 3: H-Asp(OH)-Ala-Phe-Ile-Gly-Leu-Met-NH$_2$ (see FIG. II)*

129 g. of tri-Gly-Leu-OH, 45 g. of H-Met-NH$_2$ and 65 g. of dicyclohexylcarbodiimide are dissolved in 1300 cc. of methylene chloride, left to stand overnight at 0°, filtered, the solution washed with dilute hydrochloric acid and an aqueous sodium bicarbonate solution, dried over sodium sulphate, evaporated in a vacuum and ethyl ether added. 112 g. of tri-Gly-Leu-Met-NH$_2$ (melting point 212°; $[\alpha]_D^{21}=-4°$ in dimethyl formamide) result and this is left to stand in a mixture of 600 cc. of glacial acetic acid and 600 cc. of water for 20 minutes at 90°, the mixture cooled to 20° and filtered; the solution is evaporated in a vacuum, the residue washed with ethyl ether and crystallized from methanol/ether. 62 g. of H-Gly-Leu-Met-NH$_2$ acetate (melting point 130°, decomposition; $[\alpha]_D^{21}=-35°$ in 95% acetic acid) result and a solution, prepared by dissolving 95 g. of CTB-Asp (OH)-Ala-Phe-Ile-NH-NH$_2$ in 400 cc. of 2 N hydrochloric acid and 600 cc. of dimethyl formamide at —5° and adding thereto 85 cc. of 2 N sodium nitrite and after 5 minutes 163 cc. of triethylamine and 600 cc. of dimethyl formamide is added. The mixture is left to stand overnight at 0°, evaporated in a vacuum, the residue washed with cold, dilute hydrochloric acid, dissolved in tetrahydrofuran and precipitated by the addition of water. 92 g. of CTB-Asp (OH)-Ala-Phe-Ile-Gly-Leu-Met-NH$_2$ (melting point 245°; $[\alpha]_D^{21}=-35°$ in dimethyl formamide) result and are dissolved in 2000 cc. of trifluoro acetic acid and left to stand at 28° for 1 hour. The solution is evaporated in a vacuum, dissolved in methanol, 16 cc. of tri-n-butylamine are added and the solution made to precipitate by the addition of ethyl ether. 77 g. of H-Asp (OH)-Ala-Phe-Ile-Gly-Leu-Met-NH$_2$ result. (M.P. 265°;) $[\alpha]_D^{22}=-36°$ in 95% acetic acid.

*Procedure 4(a): (see FIG. III): H-Pyr-Pro-Ser-Lys (CTB)-OCH$_3$*

280 g. of CBO-Pyr-ONP and 92 g. of H-Pro-OH are dissolved in a mixture of 1000 cc. of tetrahydrofuran and 300 cc. of water, 400 cc. of a 2 N sodium hydroxide solution are added within 20 minutes and the mixture left to stand overnight at 20°. The mixture is evaporated in a vacuum, 1500 cc. of water are added to the residue, the mixture is washed with ethyl acetate, the aqueous solution made acid with a 4 N hydrochloric acid, extracted with methylene chloride, the organic solution dried over sodium sulphate, evaporated in a vacuum and ethyl ether added to the residue. 170 g. of CBO-Pyr-Pro-OH (melting point 198°; $[\alpha]_D^{21}=-109°$ in 95% acetic acid) crystallize.

*Procedure 4(b):*

As an alternative to procedure 4(a) the following method is used. 270 g. of H-Lys(CBO)-OCH$_3$HCl, 195 cc. of tri-n-butylamine, 280 g. of tri-Ser-OH and 172 g. of dicyclohexylcarbodiimide are dissolved in 5000 cc. of chloroform, the mixture is left to stand at 0° overnight, filtered, the solution washed with dilute hydrochloric acid and aqueous sodium bicarbonate, dried over sodium sulphate, evaporated in a vacuum and ethyl ether added. 342 g. of tri-Ser-Lys (CBO-OCH$_3$ (melting point 102°; $[\alpha]_D^{21}=-45°$ in dimethyl formamide) crystallize and are dissolved in 2000 cc. of glacial acetic acid and 2000 cc. of water and left to stand for 20 minutes at 95°. 2000 cc. of water are added, the mixture cooled to 5° and the solution filtered and evaporated in a vacuum. The residue is dissolved in 1 N ammonia, extracted with methylene chloride, the organic phase dried over sodium sulphate, evaporated in a vacuum and ethyl ether added to the residue. 179 g. of H-Ser-Lys(CBO)-OCH$_3$ (melting point 78°) crystallize and this is dissolved together with the 170 g. of CBO-Pyr-Pro-OH obtained above in 1700 cc. of chloroform and 1130 cc. of acetonitrile and 102 g. of dicyclohexylcarbodiimide are added. The mixture is left to stand overnight at 0°, filtered, the solution evaporated in a vacuum, the residue dissolved in ethyl acetate, washed with dilute hydrochloric acid and aqueous sodium bicarbonate, dried over sodium sulphate, evaporated in a vacuum and ethyl ether added to the residue. 285 g. of tetrapeptide (melting point 60°; $[\alpha]_D^{21}=-76°$ in 95% acetic acid) crystallize and are dissolved in 2500 cc. of methanol and hydrogenated in the presence of a platinum or palladium catalyst at 20° and normal pressure so as to remove the carbobenzoxy radicals. The mixture is filtered, ethyl ether added to the solution and the resulting H-Pyr-Pro-Ser-Lys-OCH$_3$ (145 g.; melting point 80°; $[\alpha]_D^{21}=-94°$ in 95% acetic acid) filtered off and dissolved in 700 cc. of dimethyl formamide and 150 g. of tert.-butyl-p-nitrophenyl carbonate are added. The mixture is left to stand for 4 days at 25°, evaporated in a vacuum, the residue washed with ethyl ether and recrystallized from methylene chloride/ethyl ether. 140 g. of H-Pyr-Pro-Ser-Lys-L-(CTB)-OCH$_3$ (melting point 90°, decomposition; $[\alpha]_D^{21}=-69°$ in methanol) result.

*Procedure 5: (see FIG. IV) H-Pyr-Pro-Ser-Lys-Asp-(OH)-Ala-Phe-Ile-Gly-Leu-Met-NH$_2$*

81 g. of H-Pyr-Pro-Ser-Lys(CTB)-OCH$_3$ are dissolved in 750 cc. of methanol, 200 cc. of hydrazine hydrate are added, the mixture left to stand overnight at 20°, evaporated in a vacuum, the residue dissolved in 900 cc. of methanol and 5000 cc. of ethyl ether added. 61 g. of H-Pyr-Pro-Ser-Lys(CTB)-NH-NH$_2$ (melting point 120°; $[\alpha]_D^{21}=-68°$ in methanol) crystallize and are dissolved in 440 cc. of 1 N hydrochloric acid and 880 cc. of dimethyl formamide and 60 cc. of 2 N sodium nitrite and after 5 minutes 92 cc. of triethylamine and 65 g. of H-Asp(OH)-Ala-Phe-Ile-Gly-Leu-Met-NH$_2$ are added at −5°. The mixture is left to stand overnight at 0°, evaporated in a vacuum and the residue washed with ethyl ether and dilute acetic acid. 82 g. of hendecapeptide (melting point 230°, decomposition, $[\alpha]_D^{20}=-61°$ in 95% acetic acid) result and are dissolved in 2000 cc. of trifluoro acetic acid. The mixture is left to stand for 1 hour at 25°, evaporated in a vacuum and the residue washed with 1000 cc. of water, which has been brought to a pH value of 6.5 by the addition of sodium bicarbonate. 71 g. of H-Pyr-Pro-Ser-Lys-Asp(OH)-Ala-Phe-Ile-Gly-Leu-Met-NH$_2$ result in the form of a neutral powder which is only difficultly soluble in water. By means of acid hydrolysis in an atmosphere of nitrogen there is obtained glutaminic acid, proline, serine, lysine, aspartic acid, alanine, phenylalanine, isoleucine, glycine, leucine, methionine and ammonia in equimolecular quantities. The free peptide may be dissolved in water by the addition of 1 equivalent of an acid. The corresponding salt is obtained by evaporation.

What is claimed is:

1. A peptide selected from the group consisting of L-pyroglutamyl - L - prolyl - L - seryl - L-lysyl-L-aspartyl-L-alanyl-L-phenylalanyl - L - isoleucyl - glycyl- L -leucyl-L-methionine amide and its acid addition salts, said peptide having a protective groupy on the ε-amino radical of the lysine radical.

2. The peptide of claim 1 having a protective group on the ε-amino radical of the lysine radical which is selected from the group consisting of carbobenzoxy, toluenesulphonyl, carbo-tert.-butoxy, phthalyl, formyl, trifluoracetyl and p-nitrocarbobenzoxy radicals.

3. The peptide of claim 1 having a protective group on the ε-amino radical of the lysine radical and a protective group on the end amido radical of the L-pyroglutamine radical.

4. The peptide of claim 1 having a protective group on the ε-amino radical of the lysine radical and a protective group on the end amido radical of the L-pyroglutamine radical, the protective group on the ε-amino radical of the lysine radical being selected from the group consisting of carbobenzoxy, toluenesulphonyl-, carbo-tert.-butoxy-, phthalyl, formyl, trifluoroacetyl and p-nitrocarbobenzoxy radicals, the protective group on the end amido radical of the L-pyroglutamine radical being selected from the group consisting of carbobenzoxy, toluenesulphonyl, carbo-tert.-butoxy and p-nitrocarbobenzoxy radicals.

5. The peptide of claim 1 having protective groups on the ε-amino radical of the lysine radical and the β-carboxyl radical of the aspartic acid radical.

6. The peptide of claim 1 having protective groups on the ε-amino radical of the lysine radical and the β-carboxyl radical of the aspartic acid radical, the protective groups on the ε-amino radical of the lysine radical being selected from the group consisting of carbobenzoxy, toluenesulphonyl, carbo-tert.-butoxy, phthalyl, formyl, trifluoroacetyl and p-nitrocarbobenzoxy radicals, the protective groups on the β-carboxyl radical of the aspartic acid radical being selected from the group consisting of benzyl, p-nitrobenzyl, methyl, ethyl, tert.-butyl and amido radicals.

7. The peptide of claim 1 having a protective group on the ε-amino radical of the lysine radical, a protective group on the end amido radical of L-pyroglutamine radical and on the β-carboxyl radical of the aspartic acid radical.

8. The peptide of claim 7 in which the protective group on the ε-amino radical of the lysine radical is selected from the group consisting of carbobenzoxy, toluenesulphonyl, carbo-tert.-butoxy, phthalyl-, formyl, trifluoroacetyl and p-nitrocarbobenzoxy radicals, the protective group on the end amido radical of the L-pyroglutamine radical is selected from the group consisting of carbobenzoxy, toluenesulphonyl, carbo-tert.-butoxy and p-nitrocarbobenzoxy radicals and the protective group on the β-carboxyl radical of the aspartic acid radical is selected from the group consisting of benzyl, p-nitrobenzyl, methyl, ethyl, tert.-butyl and amido radicals.

References Cited by the Examiner

UNITED STATES PATENTS

| | | | |
|---|---|---|---|
| 2,953,558 | 9/1960 | Darlington | 260—112 |
| 2,986,573 | 5/1961 | Topliss | 167—65 |
| 2,987,442 | 6/1961 | McLean | 167—65 |
| 3,093,627 | 6/1963 | Schwyzer | 260—112 |

WILLIAM H. SHORT, *Primary Examiner.*

FRANK CACCIAPAGLIA, *Examiner.*

P. L. SABATINE, E. C. EDWARDS, H. E. SCHAIN,
*Assistant Examiners.*